Oct. 27, 1925.
T. W. GAILLARD
TOOL
Filed March 14, 1924
1,559,084
3 Sheets-Sheet 1
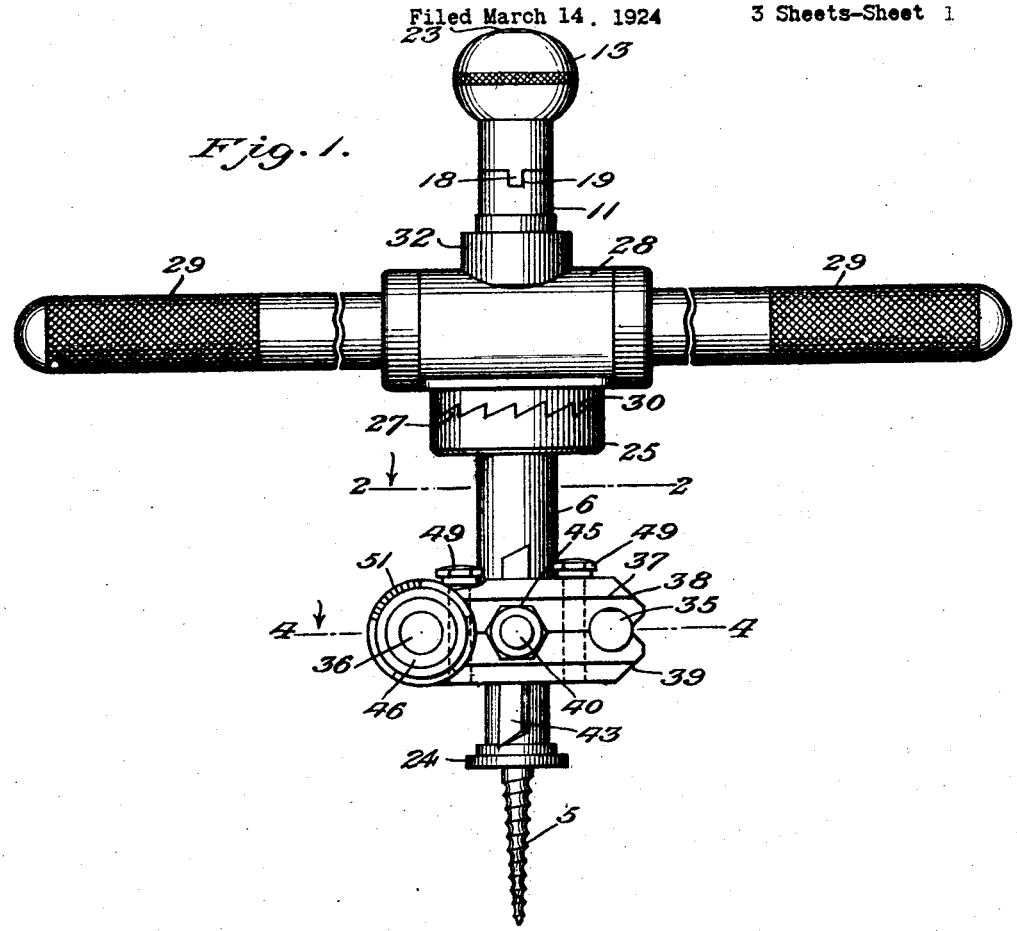
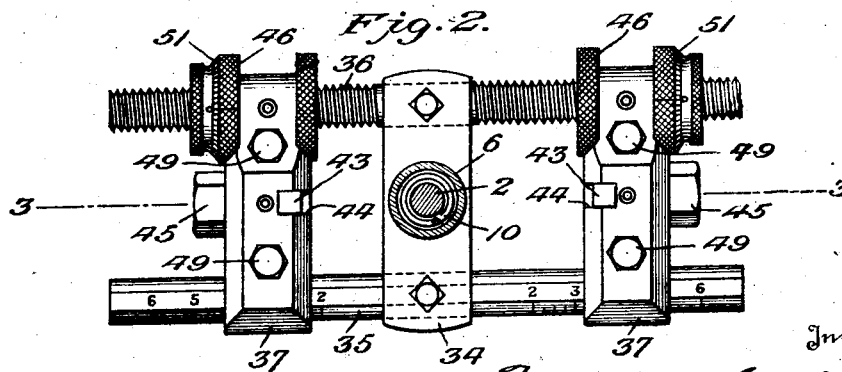

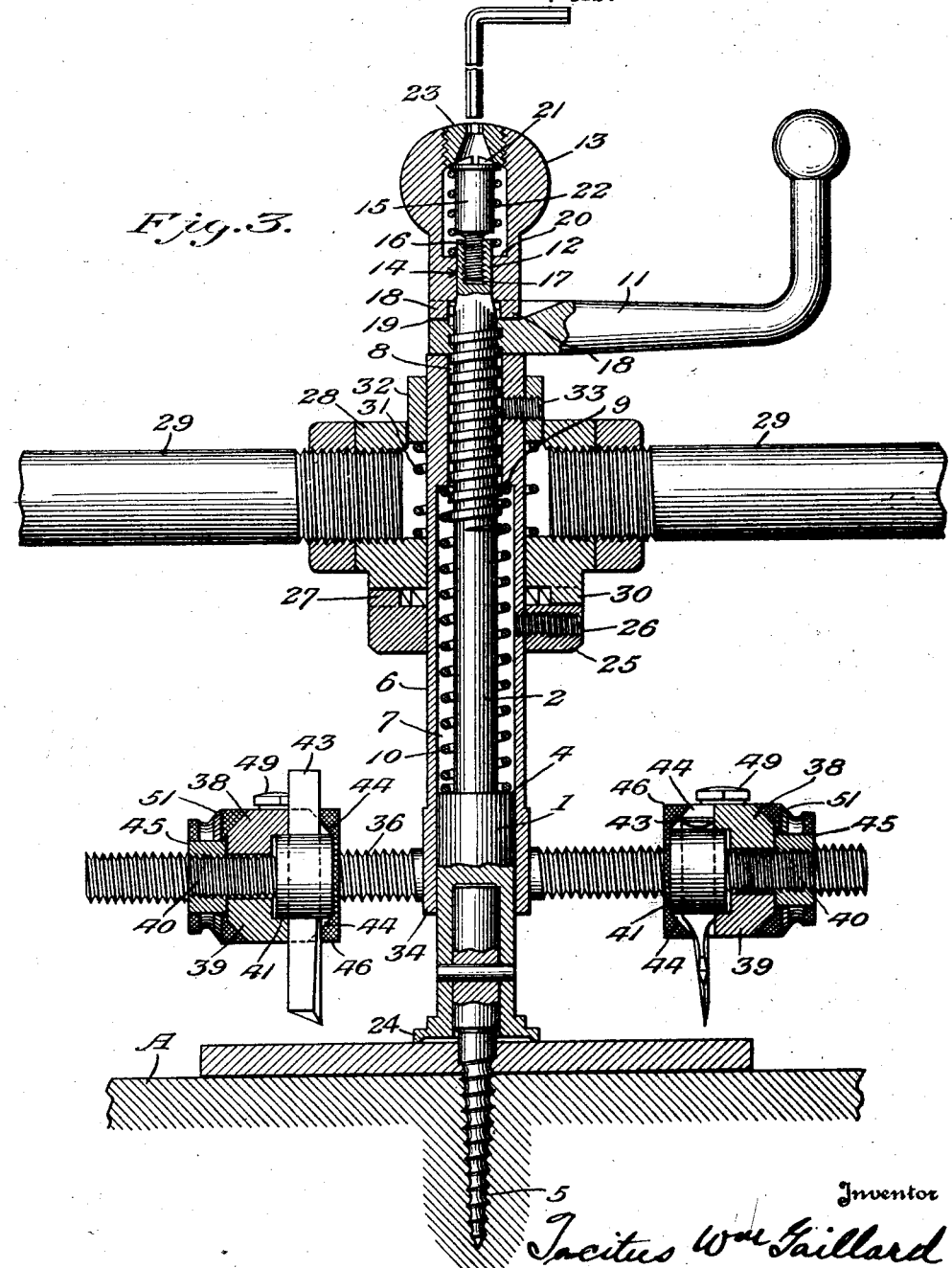

Oct. 27, 1925.  
T. W. GAILLARD  
1,559,084  
TOOL  
Filed March 14, 1924  
3 Sheets-Sheet 3
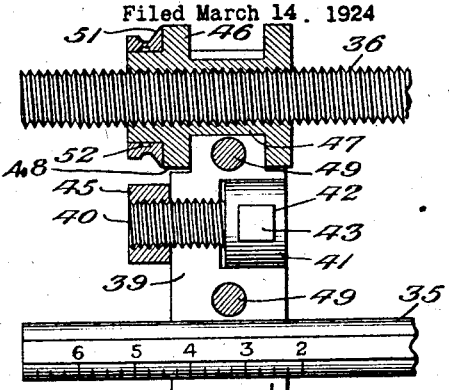
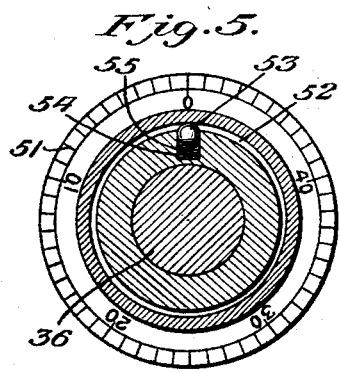
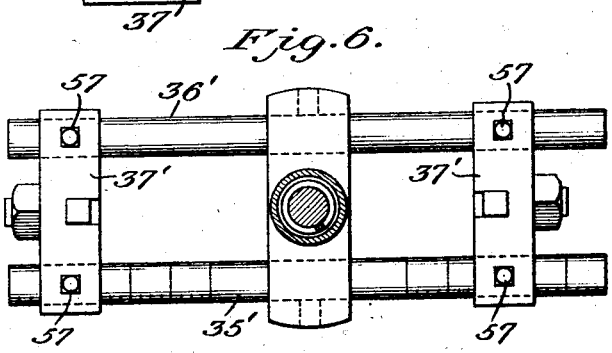
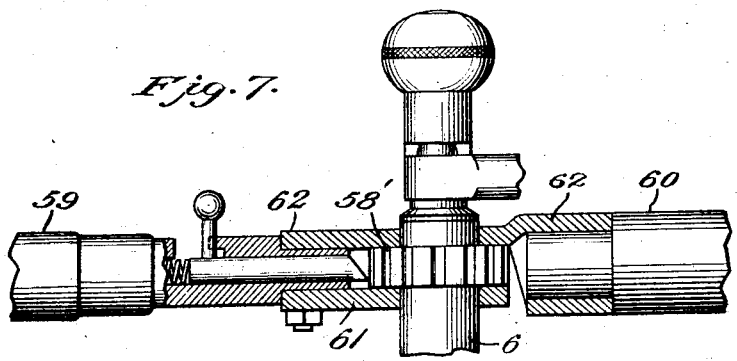
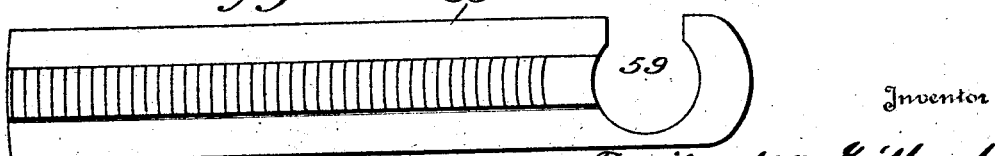
Inventor  
Tacitus Wm Gaillard  
By Vernon E. Hodges  
his Attorney Patented Oct. 27, 1925.

1,559,084

UNITED STATES PATENT OFFICE.

TACITUS WILLIAM GAILLARD, OF BROOKLYN, NEW YORK.

TOOL.

Application filed March 14, 1924. Serial No. 699,347.

*To all whom it may concern:*

Be it known that I, TACITUS WILLIAM GAILLARD, a citizen of the United States, residing at Brooklyn, in the county of Kings and State of New York, have invented certain new and useful Improvements in Tools, of which the following is a specification.

My invention relates to tools for cutting and boring holes, more particularly adapted to cut washers singly or simultaneously cut washers and disks of a given diameter.

In the accompanying drawings:

Fig. 1 is a side elevation of my device;

Fig. 2 is a section on line 2—2 of Fig. 1;

Fig. 3 is a vertical section on line 3—3 of Fig. 2;

Fig. 4 is a transverse section through one of the tool carriers taken on line 4—4 of Fig. 1;

Fig. 5 is an enlarged detail view of the knurled tool carrier adjusting nut;

Fig. 6 is a detail view of a modified form of the tool carrier and transverse carrier bars;

Fig. 7 is a view showing a modified form of ratchet mechanism; and

Fig. 8 is a detail view of a gauge for setting or checking up the adjusted cutters.

In the drawings, the numeral 1 indicates a spindle having an extended threaded portion 2 of a reduced diameter forming a shoulder 4 near the base of said spindle. The lower end of the spindle is provided with a threaded stem 5 which may be threaded with the usual machine thread or the wood screw type as occasion may require. Received upon the spindle 1 is a sleeve 6 having a hollow bore 7 of sufficient diameter to receive the base of the spindle and a reduced bore 8 of sufficient diameter to permit the threaded end of the spindle to pass through. A spring 10 surrounding the threaded portion 2 of the spindle 1, is received between the shoulder 4 of the spindle and the shoulder 9 formed in the bore of the sleeve 6. Received upon the upper end of the spindle is a threaded lever 11 which acts to compress the expansion spring 10 and hold the spindle within the sleeve 6. The upper end of the reduced threaded portion 2 of the spindle is squared as at 12 to receive a knob 13 having a squared bore 14 to engage the squared end of the spindle. This knob is preferably held in position by means of a screw 15 having a reduced threaded end 16 which is received in a threaded hole 17 in the squared end of the spindle 1. The lower end of the knob 13 is provided with radial tongues 18 which are adapted to engage a slot 19 in the upper face of the lever 11. To permit the knob to be disengaged from the lever 11, there is interposed between the shoulder 20 in the bore of the knob and the head 21 of the screw 15 an expansion spring 22, the bore of the knob 13 being normally closed by a screw threaded plug 23. When the knob 13 is in engagement with the lever 11, the lever when turned will act to rotate the spindle 1 and screw the threaded end 5 into the piece to be worked, bringing the shouldered lower end 24 of the spindle down against the work, after which the knob 13 is moved upwardly disengaging the lever 11 and the squared end of the spindle 1, thus permitting the lever 11 to be used to compress the spring 10 and force the sleeve 6 downwardly upon the spindle 1.

It is desirable to rotate the sleeve 6 with respect to the spindle 1. For this purpose a disk 25 is secured to the sleeve 6 by means of a set screw 26, said disk having upon its upper face a plurality of ratchet teeth 27. Rotatably mounted upon the sleeve is a T-block 28, provided with lateral threaded openings, to receive laterally extending actuating bars 29—29. The lower end of the T-block is preferably provided with a plurality of radial ratchet teeth 30 which are adapted to mesh with the ratchet teeth 27, said teeth being held in engagement by a spring 31 received in an enlarged bore in the upper end of the T-block 28, said spring being confined within the bore by means of a collar 32 secured to the sleeve 6 by a set screw 33, this spring permitting a step by step movement to be imparted through the ratchet teeth to the rotatable sleeve 6.

The lower end of the sleeve 6 has an enlarged head 34. Extending laterally from the head 34 in either direction is a graduated bar 35 and extending parallel to said bar 35 and on the opposite side of the center of the tool is a screw threaded feed bar 36. Mounted upon the transverse bar 35 and the feed bar 36 on the opposite side of the center are tool carriers 37 preferably consisting of upper and lower blocks 38 and 39 and arranged centrally of each tool carrier is a tool holder consisting of a screw 40 having an enlarged head 41 and an opening 42 adapted to receive the tool 43. Registering with the opening in the headed tool holder are upper and lower slots 44 arranged in the inner faces of the upper and lower tool carriers 38 and 39. The outer end of the threaded screw 40 of the tool holder receives a nut 45 which serves to secure the tool in place.

As a means for adjusting the tool carriers laterally of the boring tool I preferably secure in one end of each of the food carrier blocks 38—39 a knurled adjusting nut 46 having a reduced portion 47 received in the bore 48 in that end of the tool carrier. This nut is received upon the transverse threaded bar 36. The opposite end of the tool carrier is bored out to receive the transverse bar 35. As will be seen with the rotation of the threaded nut 46 the tool carrier will be moved transversely of the boring tool. As a means for locking the tool carrier in the desired position I preferably provide the carrier blocks 38 and 39 with a pair of clamping screws 49. Each knurled nut is provided on its outer end with a knurled dial 51 which has upon its periphery graduations from zero to fifty. Each dial is provided on its inner face with an annular groove 52 to receive a ball 53 received in an opening 54 in the shank of the knurled nut, said ball being pressed outwardly by a spring 55. The first mentioned carrier bar 35 is graduated into inches and fractions thereof. The threads on the companion transverse tool bar 36 are threaded with ten threads to one inch. The zero mark on the first mentioned transverse bar and the zero on the dial brings the starting point into calculation. One turn of the knurled nut 46 gives fifty graduations of the dial advancing the nut and the tool carrier one-tenth of an inch, or five turns of the knurled nut advances the cutter one-half inch multiplied by two which equals a change of one inch in the diameter of the article being cut. As will be seen the measurements are taken one-half the diameter multiplied by two giving the full diameter.

As disclosed in Fig. 6 I have shown a modified view of the tool carrier wherein the transverse tool carrier bar 36' is not screw-threaded and the tool carriers 37' mounted upon these transverse bars are manually adjustable, one of said transverse bars 35' being graduated to fractions of an inch, screws 57 serving to secure the tool carrier bar 37' in its adjustable position. As a means of adjusting or checking up the adjustment of these tools I have preferably used a graduated scale as disclosed in Fig. 8. This gauge 58 is provided with a slotted opening 59 at one end which has approximately the same diameter as the bottom end of the spindle 1 whereby it may be passed over the end of the spindle 1 and the tools gauged accordingly.

As disclosed in Fig. 7 the sleeve 6 is provided at its upper end with a ratchet wheel 58' keyed or otherwise secured to the sleeve to impart a rotary motion thereto when actuated. Extending laterally of the vertical sleeve 6 are the actuating handles 59 and 60. The handle 59 is provided with an extension 61 on its inner end which has an opening at the outer end thereof to receive the sleeve 6, said member 61 being placed beneath the ratchet wheel 58'. A companion member 62 extends inwardly from the handle 60, this member 62 being provided with an opening at its base to receive the sleeve and is placed on the opposite side of the ratchet wheel 58'. The handle 59 is provided with a long movable ratchet pawl which is housed between the members 61 and 62 and is adapted to engage the ratchet wheel 58', said pawl being turned in an opposite direction to effect the movement of the ratchet wheel 58' in either direction or may be placed in a neutral position when the handles are inactive.

In the tool used in this machine the cutters are adjusted to the desired radius upon each other to work either for cutting a disk or a washer in which latter case each cutter carrier is adjusted to its respective distance from the center to effect a suitable cut. The article to be worked is placed upon a base A which has a central opening to receive the threaded end 5 of the tool. In positioning the device the knurled knob 13 is turned to engage the lever 11 whereupon a rotary motion by means of the lever 11 is imparted to the spindle 1 and the spindle is screwed down into place upon the article to be worked and holds it securely in its proper position. The knob 13 is then disengaged from the lever 11 whereupon the lever is rotated about the upper screw threaded end 2 of the spindle 1 acting to force the sleeve downwardly bringing the cutters into engagement with the work. It will be observed that the fit of the tool is accomplished by means of the spring 10 interposed between the spindle 1 and the sleeve 6 as described, thereby assuring a constant even pressure when fitting the tool to the work, thus eliminating possible chattering of the tool when being rotated. Upon the completion of the cutting, the lever 11 is reversed in its movement and rotated to permit the tool and the sleeve 6 to move away from the work, after the work is cleared the knurled knob 13 is moved into registry with the slots in the lever 11 whereby the lever 11 is now caused to rotate the spindle in such a direction as to disengage it from the work table A.

Should it be desired to apply power to this device, the knob 13 and the lever 11 are removed, and a washer is placed over the threaded portion 2 of the spindle 1, adapted to rest upon the upper end of the sleeve 6, whereupon the free end of the sleeve 6 may be secured in a chuck of the drill-press or the like, and power applied to drive the tool.

I claim:

1. In a tool of the character described, the combination of a cutter head, a sleeve connected therewith, a spindle mounted in the sleeve, a handle connected with the spindle for moving the sleeve endwise in one direction relative to the spindle, and resilient means tending to force the sleeve toward the opposite direction.

2. In a tool of the class described, the combination of a cutter head, a tubular sleeve extending upwardly therefrom, a spindle journaled in the sleeve, said spindle having a feed screw on its upper end, a screw threaded lever engaging said feed screw and said tubular sleeve, and an actuating handle for said cutter head.

3. In a tool of the class described, the combination of a cutter head, a tubular sleeve extending upwardly therefrom, a spindle journaled in the sleeve, said spindle having a feed screw on its upper end, and a squared portion at its extreme upper end, a screw threaded lever engaging said feed screw and said tubular sleeve, a knob carried upon the squared end of said feed screw adapted to engage said feed lever locking the latter against rotation with respect to said feed screw and an actuating handle for rotating said cutter head.

4. In a tool of the class described, the combination of a cutter head, a tubular sleeve extending upwardly therefrom, a shouldered spindle journaled in the sleeve, said spindle having a reduced threaded upper portion, an extension spring interposed between the shoulder of said spindle and the upper end of said tubular sleeve, a screw threaded lever carried by said feed screw and engaging the upper end of said tubular sleeve and an actuating handle for said cutter head.

5. In a tool of the class described, the combination of a cutter head, a tubular sleeve extending upwardly therefrom, a shouldered spindle journaled in the sleeve, said spindle having a reduced threaded upper portion, a squared portion in its extreme outer end, an extension spring interposed between the shouldered end of said spindle and the upper end of said sleeve, a lever having a screw-threaded engagement with said spindle and adapted to bear against the outer end of said sleeve and means carried by the squared portion of the spindle for locking said lever against rotation with respect to the feed screw, and an actuating handle for rotating said cutter head.

6. In a tool of the class described, the combination with a cutter head, transverse parallel carrier bars carried by said cutter head, adjustable tool carriers carried by said parallel bars, a tubular sleeve extending upwardly from said cutter head, a screw-threaded spindle journaled in the sleeve, a screw threaded lever carried by said spindle adapted to engage said tubular sleeve for effecting a vertical movement of said tubular sleeve, and an actuating handle for rotating said cutter head.

7. In a tool of the class described, the combination of a cutter head, transverse parallel carrier bars carried by said cutter head, a tool carrier arranged transversely of said parallel carrier bars, one of said carrier bars being threaded, a knurled nut journaled in said tool carrier and engaging said screw threaded bar and means for clamping said tool carrier to said transverse carrier bars, a tubular sleeve extending upwardly from said carrier head, a screw-threaded spindle journaled in the sleeve, a screw threaded lever carried by said spindle adapted to bear against the outer end of said tubular sleeve for imparting a vertical movement to said cutter head and an actuating handle for rotating said cutter head.

8. In a tool of the class described, the combination of a cutter head, transverse parallel carrier bars carried by said cutter head, one of said bars being threaded and the other of said bars being graduated, tool carriers arranged between said carrier bars, nuts journaled in said tool carriers and engaging said threaded carrier bar, graduated dials carried by said nuts, clamping means carried by them for locking said tool carriers against movement, a tubular sleeve extending upwardly from said cutter head, a spindle journaled in the sleeve, said spindle having a reduced threaded upper portion extending above said tubular sleeve, a screw-threaded lever carried by said spindle adapted to engage with the upper end of said sleeve, an extension spring interposed between the lower end of said spindle and the upper end of said tubular sleeve and means carried by said spindle and for locking said lever against rotation with respect to said spindle, a ratchet wheel carried by said tubular sleeve and actuating handles rotatably mounted upon said tubular sleeve and provided with ratchet teeth to engage the ratchet wheel upon said spindle for rotating the latter.

9. In a tool of the class described, the combination of a cutter-head, a tubular sleeve extending upwardly therefrom, a spindle journaled in the sleeve, said spindle having a feed-screw on its upper end, a screw-threaded lever carried by said spindle and bearing against the upper end of said tubular sleeve, and means for locking said lever against rotation with respect to said feed-screw.

10. In a tool of the class described, the combination of a cutter-head, transversely parallel carrier bars carried by said head, adjustable tool carriers carried by said parallel carrier-bars, a tubular sleeve extending upwardly from said cutter-head, a screw-threaded spindle journaled in the sleeve, a screw-threaded lever carried by said spindle, and adapted to engage said tubular sleeve for effecting a vertical movement thereof, means for locking said lever against movement with respect to said spindle, and an actuating handle for rotating said cutter-head.

11. In a tool of the character described, the combination of a threaded rotatable spindle, a rotatable cutter-head surrounding said rotatable spindle, a feed-lever carried by said threaded spindle adapted to engage said rotatable cutter for feeding it in one direction, and means for locking said feed-lever and threaded spindle together for actuating said fastening screw.

12. In a tool of the class described, the combination of a threaded rotatable spindle, a rotatable cutter-head surrounding said rotatable spindle comprising transversely parallel carrier-bars carried by said rotatable cutter-head, adjustable tool-carriers carried by said parallel bars, and a feed-lever carried by said rotatable spindle adapted to engage said rotatable cutter-head for feeding it in one direction.

13. In a tool of the class described, the combination of a threaded rotatable spindle, a rotatable cutter-head surrounding said rotatable spindle comprising transversely parallel carrier-bars carried by said rotatable cutter-head, adjustable tool-carrier carried by said parallel bars, a feed-lever carried by said rotatable spindle adapted to engage said rotatable cutter-head for feeding it in one direction, and means for locking said foot-lever against movement with respect to said spindle, and an actuating handle for said rotatable cutter-head.

14. A tool of the character described including a cutter head, graduated and threaded bars connected therewith and extending laterally from said cutter head, a tool carrier mounted between the transverse bars and carried thereby, a nut journaled in said tool carrier and engaging said threaded bar for moving the cutter head laterally.

In testimony whereof I affix my signature.

TACITUS WM. GAILLARD.